United States Patent [19]

Thompson

[11] 4,372,454
[45] Feb. 8, 1983

[54] BLOW MOLDED CONTAINER WITH HANDLE

[76] Inventor: Mortimer S. Thompson, P.O. Box 113, Enfield, Conn. 06082

[21] Appl. No.: 237,081

[22] Filed: Feb. 23, 1981

Related U.S. Application Data

[60] Division of Ser. No. 28,886, Apr. 10, 1979, Pat. No. 4,280,859, which is a continuation of Ser. No. 877,603, Feb. 14, 1978, abandoned.

[51] Int. Cl.³ .............................................. B65D 23/10
[52] U.S. Cl. ................................................ 215/100 A
[58] Field of Search ......................... 215/100 A, 1 C; 220/94 A

[56] References Cited

U.S. PATENT DOCUMENTS

| | | | |
|---|---|---|---|
| 601,988 | 4/1898 | Smalley | 215/100 A |
| 3,100,576 | 8/1963 | Frank | 215/100 A X |
| 3,115,682 | 12/1963 | Soubier | 264/515 X |
| 3,307,752 | 3/1967 | Anderson | 215/100 A UX |

FOREIGN PATENT DOCUMENTS 818618  8/1959  United Kingdom ........... 215/100 A Primary Examiner—Donald F. Norton
Attorney, Agent, or Firm—Morgan, Finnegan, Pine, Foley & Lee

[57] ABSTRACT

Blow molded containers are provided with integral handles for carrying and/or pouring. Structures and processes applicable to stretch blow molding are described.

10 Claims, 49 Drawing Figures

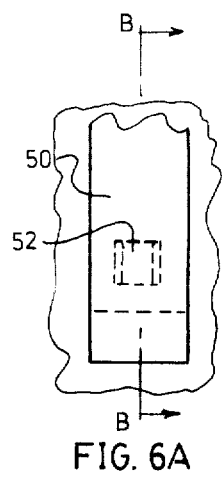
FIG. 6A
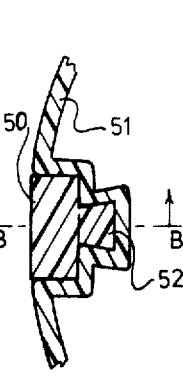
FIG. 6B
FIG. 6C
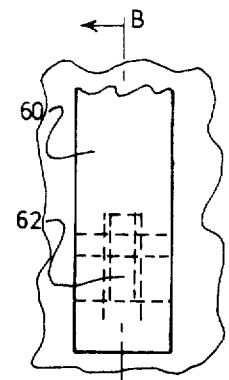
FIG. 7A
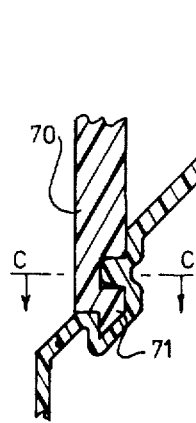
FIG. 8B
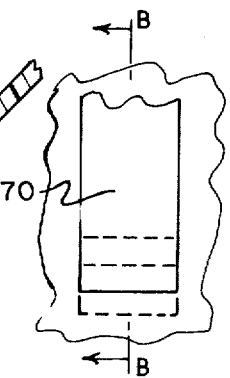
FIG. 8A
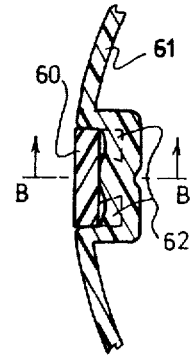
FIG. 7C
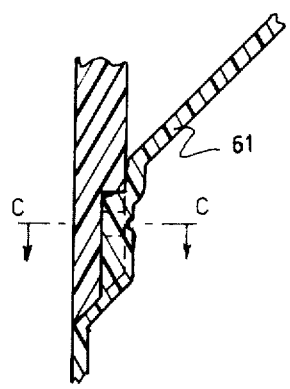
FIG. 7B
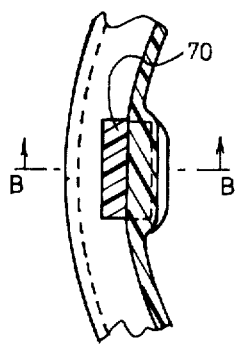
FIG. 8C
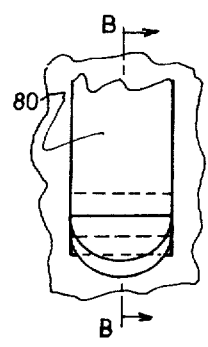
FIG. 9A
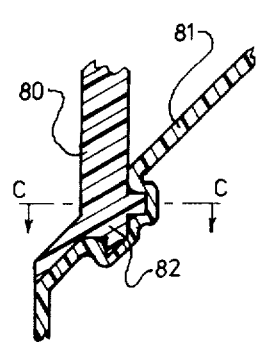
FIG. 9B
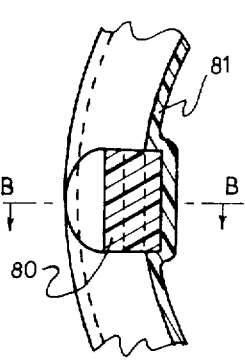
FIG. 9C

BLOW MOLDED CONTAINER WITH HANDLE

This is a division of application Ser. No. 028,886 filed Apr. 10, 1979, now U.S. Pat. No. 4,280,859, which is a continuation of application Ser. No. 877,603 filed Feb. 14, 1978 and now abandoned.

BACKGROUND OF THE INVENTION

1. Field of the Invention

The invention is concerned with plastic containers produced by blow molding. Of particular interest is blow molding as carried out over the lower range of permissible temperature so as to result in biaxial orientation.

2. Description of the Prior Art

Plastic containers, that is, containers constructed primarily of substituted or unsubstituted hydrocarbons have, for some time, been in prevalent use. Increased popularity, as compared with inorganic glasses, is due to a variety of factors—inter alia, improved impact resistance, reduced weight, and, perhaps most significantly, reduced cost.

As would be expected, procedures for producing so popular a commodity have been in continuing transition. What started as a simple operation, analogous to that used for inorganic glass has evolved through a variety of stages. Today, most containers are produced by procedures which involve a first formation of a preform, sometimes denoted a parison, followed by expansion of the preform to produce the final container. Preforms are commonly produced by any of the various molding operations with extrusion and injection being predominant. Expansion is commonly by means of gas pressure with final form being determined by a mold specifically designed for this operation.

A most sophisticated form of blow molding is now becoming commercially significant. It differs from earlier procedures in that the parison is first stretched and then blown while its temperature is much lower than with conventional processes—generally, within the 100° F. range above $T_c$ (the temperature at which the plastic material passes from the glass phase to the rubber phase). This procedure, which is known as stretch-blow molding, or orientation blow molding, is not only replacing more conventional procedures, but is opening up new markets. Advantages of the new procedures are all related to biaxial orientation of the polymer material. Regardless of how the parison is initially formed—e.g., whether by extrusion or injection, regardless of whether the procedure is two-stage or in-line, the parison, while at a temperature insufficient to permit free plastic flow is expanded biaxially to conform with the blow mold. The temperature of operation generally within the 100° F. range immediately above $T_c$ is such that expansion introduces true strain into the material. The strain translated into a definable polymer orientation results in a number of attributes.

Alignment of polymer molecules results in increased tensile strength, as well as increased clarity, increased impact strength, and reduced creep. A vast market for carbonated soft drink containers is a direct result of significantly improved gas barrier properties.

Suitable container materials are substituted and unsubstituted thermoplastic hydrocarbons. Commonly used materials at this time include acrylonitrile, polyethylene terephthalate, and polypropylene. The described procedures are well known—descriptions are included in standard reference texts. See, for example, Modern Plastics Encyclopedia, Vol. 54, No. 10A, 1977–1978, McGraw-Hill Publishing Co. (e.g., sections on "Blow Molding" at page 230 et seq.; "Injection-Blow Molding" at page 232 et seq.; and "Stretch-Blow Molding" at page 233 et seq.). It is well known that the various types of stretch-blow molding procedures, as well as conventional injection blow molding procedures, have not been successfully adapted to the production of a container including an integral handle. Commercially, plastic containers with handles have been made exclusively by extrusion-blow molding procedures wherein a large diameter parison is pinched in such a way as to define a handle area which is subsequently blown with the rest of the container to its final dimensions. This process depends on the use of high plastic temperatures to provide satisfactory fusion of the plastic in the blow mold when it is pinched prior to expansion with the pressurizing medium. It also depends on the use of large diameter parisons and forming the neck finish in the blow mold. A further limiting feature is that such handles are hollow and interconnected with the cavity of the container so that the handle must also act to contain product. This and other design limitations preclude consideration of such processes for certain important markets.

The problem of producing plastic containers with handles using stretch-blow processes derive from the nature of the process and the condition of the plastic at the time it is biaxially oriented. It is not possible to produce handles by the aforementioned parison pinch-off technique because the plastic temperature required for suitable molecular orientation is much too low to permit adequate fusion of the plastic. To form the handle and neck finish first at elevated temperatures and then cool to biorientation temperatures before stretching and blowing would yield handles and substantial other unoriented portions of the container with inferior containment and other properties. Additionally, the prime current market for bioriented containers is for soft drinks where its success depends on the use of a bottle shape optimally designed for pressurized use. Such designs are not possible in the processes heretofore considered.

And so the common assessment of the market place has been that stretch-blow molding processes are incompatible with the production of integral handles and attempts to overcome this problem have generally taken the form of mechanical fixtures. A variety of discrete handle configurations have been attached by means of bands and the like. Such attachments have been suitable for carrying but not for pouring with a one-handed grip.

An approach described in French Pat. No. 1,192,475 has apparently not found commercial use. The procedure described in conjunction with FIGS. 12 and 13 of that reference as applied to conventional (not stretch) blow molding makes use of a completely formed return handle attached at both upper and lower extremities to a parison portion not subjected to blow molding. While permitting undisturbed blowing in the bottom portion of the parison; this approach is undesirable because an excessive portion of the length of the parison cannot be blown resulting in inefficient material utilization, container shape and size restrictions even when a small, one-finger, jug-style handle is contemplated. Additionally, such an approach when translated to stretch-blow processes leaves substantial portions of the container between the extremities of the handle in a non-oriented, and therefore inferior, state.

SUMMARY OF THE INVENTION

Blown containers of the invention include handles integral with the container. Handles are an integral part of the parison or preform being affixed at a single plane normal to the major axis of the parison outside the region to be blown. Material waste is thereby minimized and container design freedom maximized. In addition, such handle regions may serve as gripping regions during blowing and for support during filling and capping. Stretch-blow processes in accordance with the invention provide opportunity to biorient a maximum portion of the parison and container.

The teaching is of sufficient breadth to include final blown containers in which handle form and joinder are independent of blowing. Handle configurations may be simple bar-shaped, L-shaped, T-shaped, or may even return to result in double joinder on the same parison plane. They may serve for pouring or carrying.

Preferred embodiments of the invention are directed to handles with lower extremities somehow affixed to a blown portion of the container. Species include those in which such second joinder is accomplished mechanically as by use of encircling bands, labels and the like but also include embodiments in which joinder at least partially results from handle-interlocking and/or bonding with a blown region.

While the keyed or interlocked configuration is believed suitable for most uses, an alternative, in which joinder is accomplished by fusion or bonding is certainly a desirable embodiment. The nature of the blowing operation generally precludes sufficient heat in the blowing region to accomplish fusion. A variety of bonding operations including, inter alia, welding and adhesive bonding serve. Bonding may be independent of, or ancillary to, interlocking.

BRIEF DESCRIPTION OF THE DRAWING

FIGS. 6A, 6B, and 6C are a broken plan view and sectional views, respectively, of configurations alternative to those of FIGS. 5.

FIGS. 7A, 7B, and 7C are a broken plan view and sectional views, respectively, which depict another alternative to those of FIG. 5.

FIGS. 8A, 8B, 8C, and FIGS. 9A, 9B, 9C of the same general form as FIGS. 6A, 6B, and 6C, depict yet additional alternatives to those of FIGS. 5.

DETAILED DESCRIPTION

1. The Drawing

The following figure descriptions are concerned with configuration, although views illustrative of appropriate processing steps and apparatus are sometimes included. All embodiments depicted and all others within the inventive teaching share in common the pre-blown molding which contains a completed or inchoate handle as an integral part. This handle is invariably attached over a localized region ideally corresponding with but a single plane normal to the major axis of the pre-blown molding. In each instance, the pre-blown molding, however, produced (sometimes characterized as a parison or preform) is blow molded to conform with an appropriate blowing mold. While not explicitly discussed, molding may take the traditional form with temperature significantly above the glass-rubber transition temperature or it may be carried out at reduced temperature, generally within the range of from $T_c$ to $T_c$ plus 100° F. to result in biaxial orientation. The latter procedure, the preferred embodiment of the invention, results so long as the temperature of the plastic material is sufficiently low to result in biaxial orientation sometime during— not necessarily throughout—expansion.

Figure 1A:
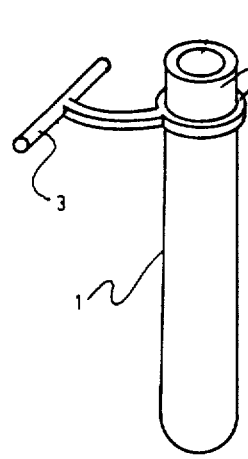
FIGS. 1A and 1B are perspective views, respectively, of a parison and a broken section in perspective of the corresponding blown container provided with a "T" bar.
Figure 1B:
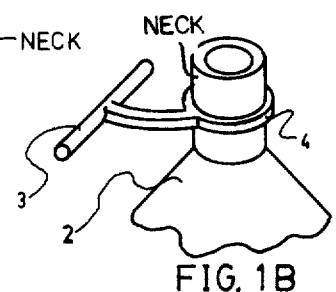

FIGS. 1A and 1B are a perspective view of a parison 1 and of a broken portion of blow molded container 2 produced from such parison 1. The "T" bar carrying handle 3 is an integral portion of parison 1, being molded as a portion of a ring 4 about the entire periphery of parison 1. Ring 4 may serve for gripping during blowing.

Figure 2:
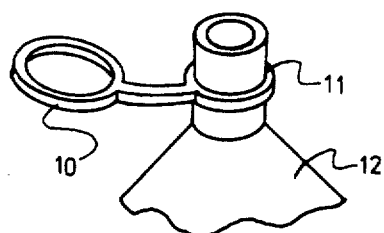
FIGS. 2, 3, and 4 are perspective views of handle portions of blown structures alternate to that of FIG. 1B and are provided, respectively, with a single joinder loop, a double joinder loop, and an "L" carrier.

FIG. 2 is a view of a blown container illustrative of a carrying handle configuration alternative to that depicted in FIG. 1B. In this instance, the "T" is replaced by a loop which is a part of ring portion 11 of a parison which when blown results in a container of which 12 is a portion.

Figure 3:
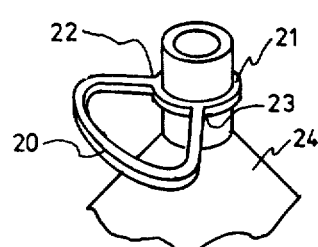

FIG. 3, again of a form corresponding with FIG. 1B, is illustrative of a form of carrying handle 20 of loop configuration which returns to ring section 21 at two regions, 22 and 23. The entire loop configuration, an integral part of the parison, is unaffected in the blowing operation which results in the blown container of which 24 is a section.

Figure 4:
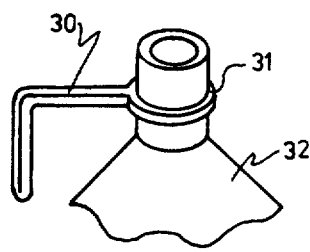

FIG. 4, depicts another structure alternative to that of 1B, this time produced from a parison molded in a form to include "L" handle 30 attached to ring portion 31 resulting in a blown container 32.

Figure 5A:
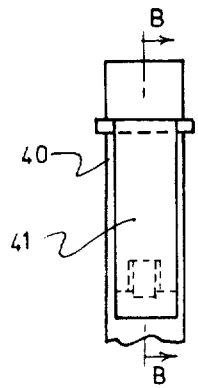
FIGS. 5A and 5F are plan views and 5B through 5E sectional views, all views of preferred embodiments in accordance with which a handle molded in a portion outside the blown portion of the parison is attached to a blown region during blowing. Reference is made to these views in the fabrication of such embodiments.
Figure 5B:
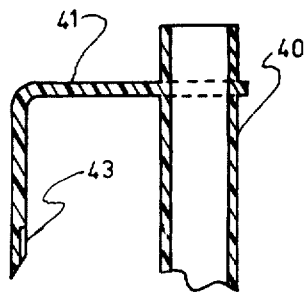

FIGS. 5A and 5B depict a parison 40 including an "L" handle region 41 of the general configuration of that shown in FIG. 4. The lower extremity of the "L" handle 41, however, is of such configuration as to expedite attachment to the blown container 42.

Figure 5C:
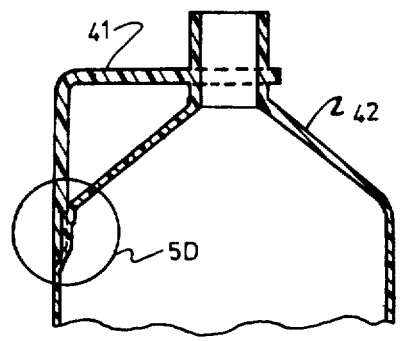

In FIGS. 5B and 5C the configuration provides for a notched extremity 43 to facilitate bonding. The blow mold, not shown, may have provision for insertion of the notched region of handle 41 so that it, in effect, becomes a portion of the inner surface of the blow mold during blowing. In this manner, the sidewall is blown against, into and around the configuration of the handle end to secure a gripping attachment. To facilitate the molding of the sidewall into such configurations, it may be desirable to vibrate the handle end to promote slippage and/or generate heat.

Figure 5E:
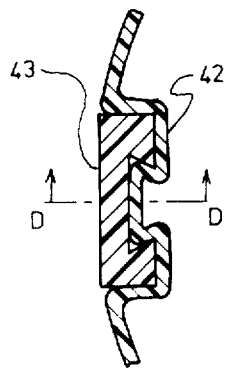
Figure 5D:
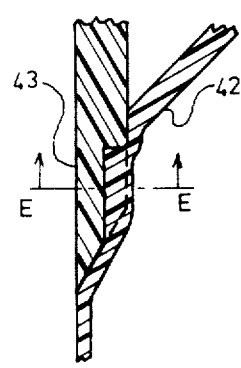

FIG. 5D is a detailed view of this arrangement.

FIG. 5E is a detailed view of the same region shown in FIG. 5D but showing a section through a plane or orthogonal to that of FIG. 5D. The undercut notch of extremity 43 is clearly seen. The distorted region of blown container 42 conforming to the notch is also visible.

Figure 5F:
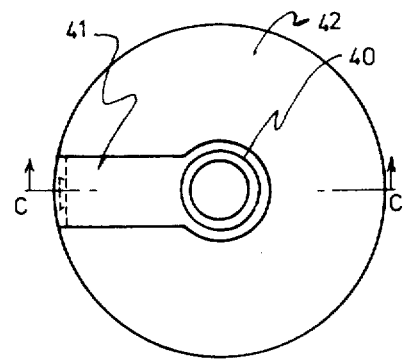
Figure 10A:
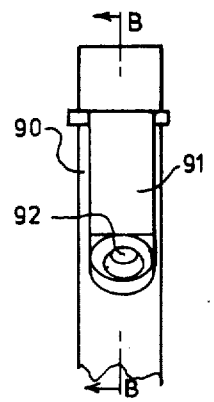
FIGS. 10A and 10E are plan views and 10B, 10C and 10D are sectional views all depicting an embodiment in which a pouring handle is formed on a blown bottle with the lower extremity being attached by spin-welding.
Figure 10B:
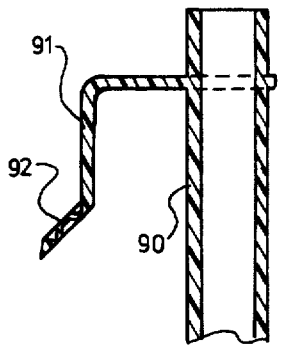
Figure 10C:
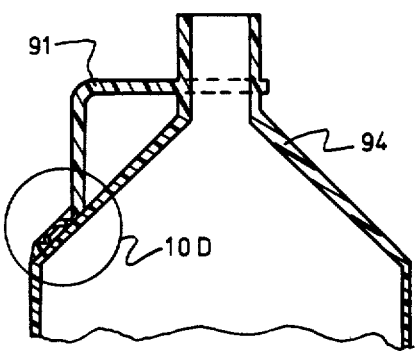

FIG. 5F is a top plane view showing handle 41, as well as the neck region of parison 40 and the blown container 42.

FIG. 6A, 6B, and 6C are illustrative of a configuration in which a handle region 50, again, facilitates connection with blown container wall 51 by interlocking, but which, in contradistinction to handle extremity 43 of FIG. 5, constitutes the male rather than female member of the pair. Again, wall 51 is distorted to meet with 50 with distortion being produced during blowing. Male projecting region 52 is shown in phantom in elevational view 6A. FIGS. 6B and 6C are, again, representations on planes orthogonal one to the other.

FIGS. 7A through 7C correspond in form with those of FIGS. 6A through 6C and depict a structure in which a lower extremity of handle 60 is shaped at 62 to mate with blown wall 61.

FIGS. 8A through 8C are views corresponding with those of FIGS. 6 and 7. The handle, in this instance designated as member 70, is provided with an undercut configuration 71 which results in firm mating resistant of all anticipated stress directions contemplated during a normal pouring operation.

FIGS. 9A through 9C depict handle 80 which mates with blown container wall 81 at region 82, again, with a shaped pattern designed to result in a high integrity joinder.

FIGS. 10A through 10E are illustrative of a joinder procedure for welding a handle which may otherwise be of the general configuration shown in any of the figures immediately preceding. Welding is due to friction produced upon rotation of a plastic member, the procedure being known as spin-welding. In accordance with this procedure, the parison here denoted 90 is provided with a handle 91 which is injection molded to include a button region 92 which is attached to the remainder of handle 91 only by regions 93, easily severed to be spun by an appropriate tool to produce a friction to blown side wall 94 at weld area 95.

Figure 11A:
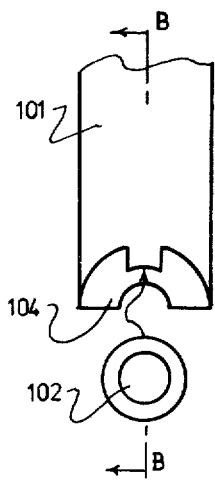
FIGS. 11A, 11B, 11C, and 12A, 12B, all section except 11A in plan, are views illustrative of spin-welding attachment of lower handle extremity alternative to that of FIGS. 10A through 10E.
Figures 10D, 10E:
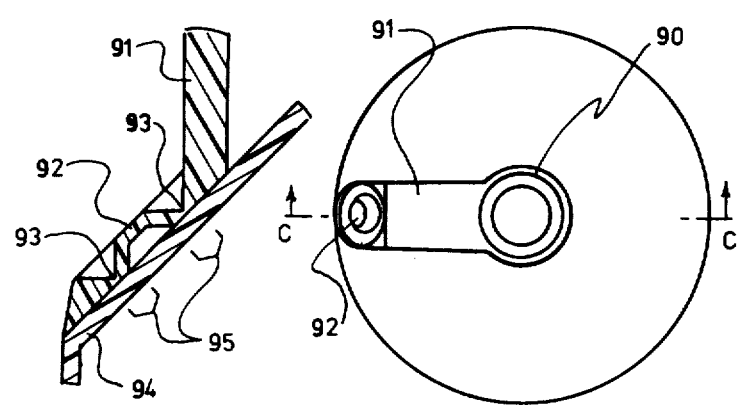
Figure 11B:
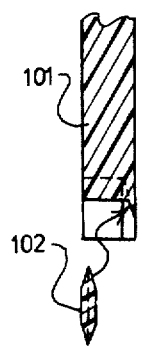
Figure 11C:
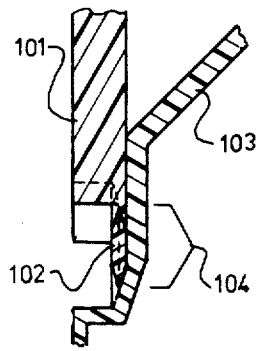

FIGS. 11A through 11C depict a structure alternative to that of FIG. 10A through 10E, again, a parison, not shown, includes a handle 101 which, in this instance, is bonded by means of a separate button 102 so as to bond to blown side wall 103 in the region of weld area 104.

Figure 12A:
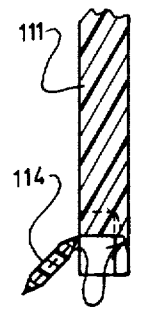
Figure 12B:
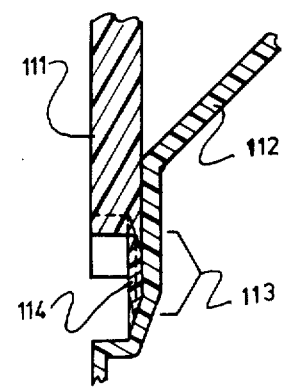

In FIGS. 12A and 12B, a handle end 111 is bonded to a blown side wall 112 over a weld region 113 by means of an attached button 114 which is easily severed. As in FIGS. 10 and 11, bonding is by friction produced by means of a rotating tool, not shown. Temperature is attained only locally and only over an appropriate surface region of side wall 112. The operation carried out subsequent to blowing is controlled so as to result only in local surface heating and thereby prevents substantial impairment of blown properties.

Figure 13A:
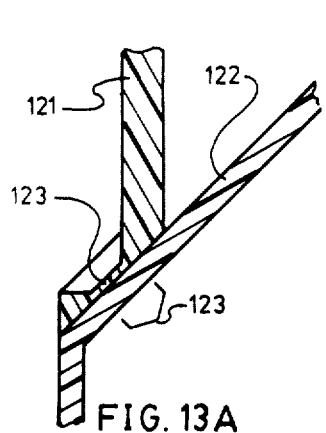
FIGS. 13A in section, 13B in plan, and 13C in section, are views illustrative of embodiments in which a handle, part of the upper region of the parison before blowing, is return-bonded to a blown region of a container by any of a variety of bonding techniques alternative to spin-welding.
Figure 13B:
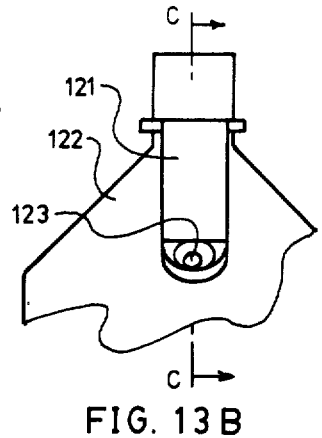
Figure 13C:
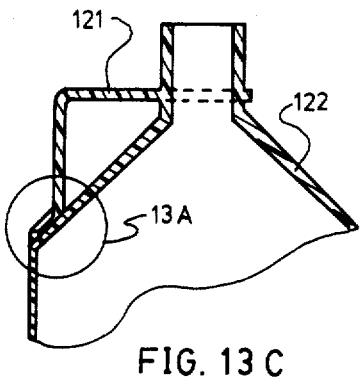

FIGS. 13A through 13C are included to depict a procedure for bonding a lower handle extremity to a blown container by any of several bonding procedures including gas welding, ultrasonic welding, high frequency bonding, etc. In this embodiment, a handle end 121 is bonded to a blown container side wall 122 via a thin wafer 123 which serves as the bonding medium. The thin wafer may simply be a lower melting point material (than that of the material from which handle 121 and side wall 122 are composed) or may be provided with filler which increases the absorption cross-section for some form of energy utilized for bonding. Bonding procedures which may be utilized may include simple heating, or may take the form of ultrasonic vibration, or of high frequency electric or magnetic fields designed to produce heating in wafer 123 or at its interface with the sidewall.

Alternatively, using the configuration of FIGS. 13A through 13C, suitable bonding agents may be applied between the wafer 123 and sidewall 122 which may be activated by the various energy sources described above.

Alternatively, the configuration of FIGS. 13A through 13C may be used where adhesive bonding is achieved without activation by energy sources such as may be achieved with water-based, solvent-based or other adhesives which cure at ambient conditions.

Figure 14A:
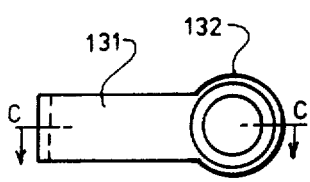
FIGS. 14A, 14B, 14C, and 14D are, respectively, a top, a front, and sectional views of a parison including a projecting "L" handle and, finally, of the corresponding portion of the blown container.
Figure 14B:
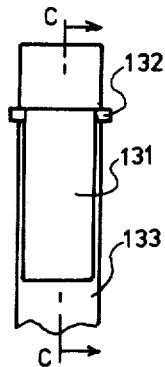
Figure 14C:
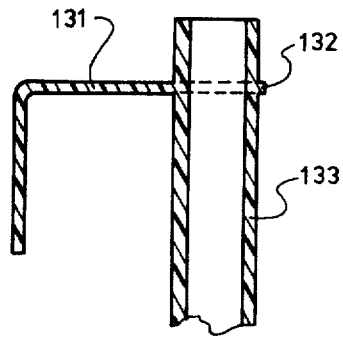
Figure 14D:
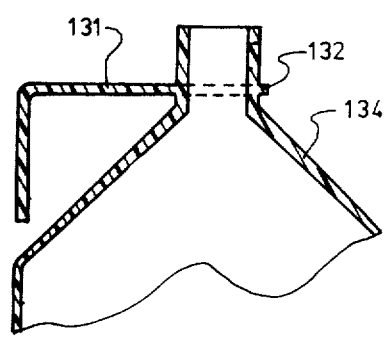

FIGS. 14A through 14D are, respectively, plane front and side views in section of a parison handle 131 which is an integral portion of ring region 132 of parison 133. The final blown configuration shown in FIG. 14D shows the blown side wall 134 and handle and ring regions 131 and 132, respectively, unchanged. The final configuration is generally that depicted in FIG. 4.

Figure 15A:
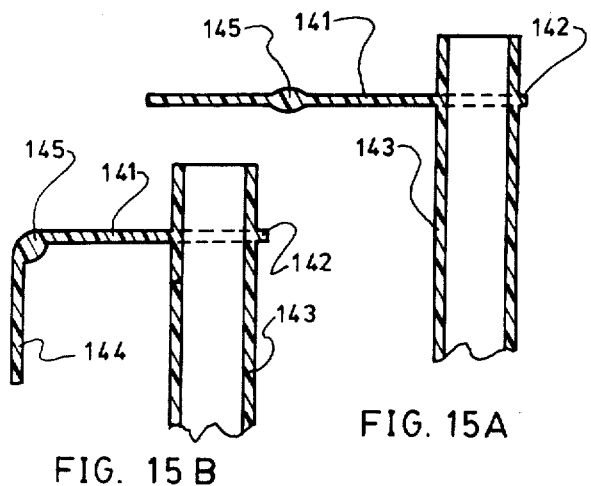
FIGS. 15A and 15B are sectional views of a parison at two stages during processing in which a handle is deformed from a straight bar to an "L".
Figure 15B:
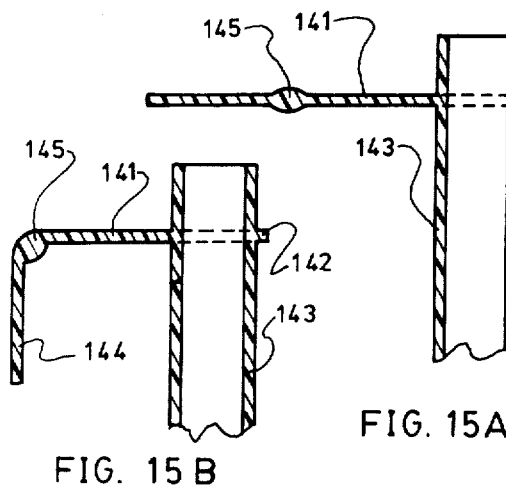

FIGS. 15A and 15B are included as illustrative of an expedient procedure for producing an "L"-shaped handle. In these figures, a bar handle 141 attached to ring portion 142 of parison 143 is deformed by means not shown by deforming bar handle 141 to produce orthogonal handle region 144. Deformation produced by simple pressure during or subsequent to any otherwise orthodox molding step is expedited by enlarged handle region 145 which, due to residual heat, is selectively deformed.

Alternatively, region 145 may be of lesser thickness and heated to achieve localized deformation in order to achieve the desired "L" shape.

Figure 16A:
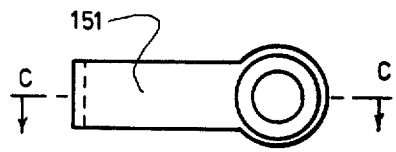
FIGS. 16A, 16B and 16C are top, front and sectional views of a parison corresponding with 14A, 14B, and 14C, and 16D a sectional view of a blown container corresponding with 14D but in which the "L" handle is provided with a shaped extremity which facilitates bonding to a blown region of the container.
Figure 16B:
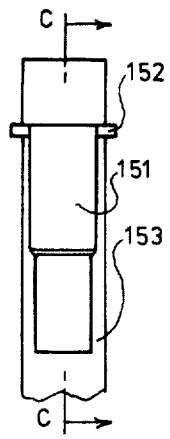
Figure 16C:
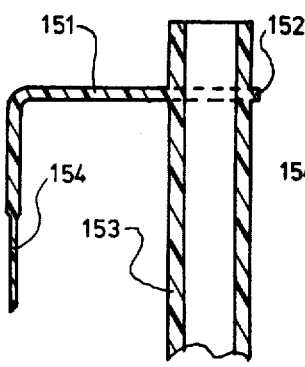
Figure 16D:
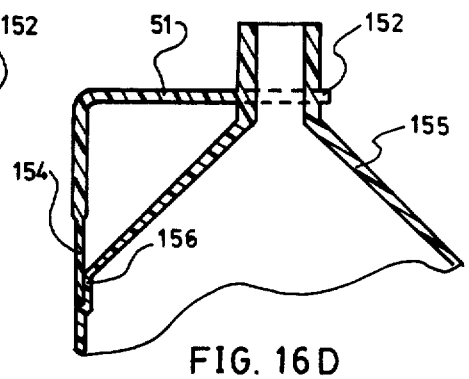
Figure 17A:
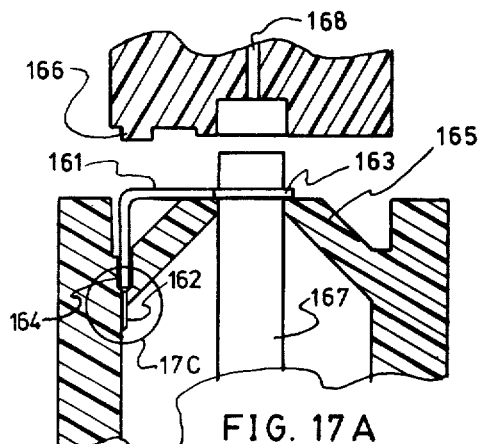
FIGS. 17A through 17C are sectional and plan views of blow molding and ancillary apparatus suitable for the fabrication of the configuration of FIG. 16D.
Figure 17C:
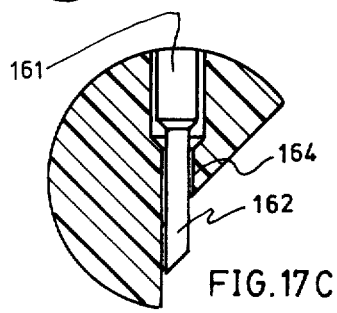
Figure 17B:
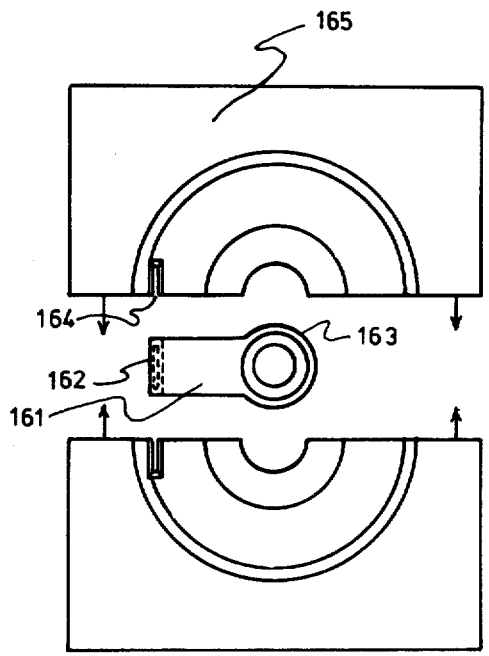

In FIGS. 16A through 16D, a handle region 151, again, part of a ring section 152 of preform 153 forms an "L" configuration, this time with a lower extremity region 154 which is, itself, reduced in cross-section so as to facilitate insertion and sealing of the handle end in a suitable slot in the blow mold (shown in FIGS. 17A through 17C). The reduced cross-section creates shoulders around the periphery of the handle end which seal the slot against "blow outs" of container wall 155 which can result in region 156 from a desirable loose fit in the slot and the high pressures of the blowing gas.

FIGS. 17A through 17C depict apparatus and operation suitable for the preparation of the configuration of FIG. 16D. Here the handle region 161 with reduced extremity 162, again, forming a portion of ring region 163 is forced into an aperture 164 provided in blow mold 165 by handle depresser 166 prior to expansion of preform 167 resulting from pressure introduced by blow air hole 168.

2. The Process

Processing in accordance with the invention invariably contemplates a blowing step in which a preform is expanded to conform with a mold. The general procedure is well known and is described, for example, in the reference set forth under prior art. The type of blowing operation of primary concern from the inventive standpoint results in biorientation of polymer molecules. Biorientation can only occur over a range of temperatures within which some part of the stress applied during blowing produces strain in the polymer. It has been indicated that this requirement is met in many polymer materials if blowing is carried out within a finite temperature range above $T_c$. For these purposes, $T_c$ is assigned its conventional meaning of the temperature representing the transition from the glass phase to the rubber phase produced upon heating of the polymer. An acceptable range for biorientation—i.e., for stretch blow molding in the usual case, does not exceed 100° F. above $T_c$. To a significant extent, the degree of biorientation and, in consequence, the improvement in physical properties attendant upon this parameter increases for a given degree of expansion as temperature is decreased. A significant improvement in properties is generally found to result in those procedures in which the average wall thickness is reduced by a factor of at least two, while the plastic is at a temperature within 100° F. or preferably 50° F. above $T_c$. This is considered to be preferred from the standpoint of stretch blow molding, per se, and in similar fashion is considered to define a preferred embodiment in accordance with the invention.

Formation of handles as integral portions of plastic bottles requires attainment of adequate fusion temperature. In conventional molding, handles have been produced by parison pinch-off necessarily requiring attainment of fusion temperature. In alternative procedures, projections have been molded by appropriately shaped molds as an integral part of the operation.

The complexity of blow molding operations, as commercially practiced, have attained a high degree of sophistication and options are available to produce containers of varied shape. However, imposition of the further requirement of complex blow molds or of local welding or of additional molding or forming sequences or of extenuated container neck portions have, in the general view, been considered impractical means for producing handleware, especially for bioriented containers.

The inventive process seeks to avoid the problem by an alternative route.

3. The Parison

In accordance with the inventive approach, a preform (or parison) is somehow provided with an integral projection generally of the same material of which the parison is constructed. In the usually contemplated case, the preferred embodiment, the projection is the result of a unitary molding operation—generally, an injection molding operation. Known preferred alternatives may result in such projection attached by welding or other means, for example, to an extruded preform.

As seen from the drawings, the projection, eventually to serve as a handle, may expeditiously be attached at a thickened region ultimately to serve as a gripping section for subsequent blow molding. The thickened portion generally required for the blow molding operation offers the additional structural integrity desired for a stress point resulting from handle usage. Such gripping sections are necessarily close to an extremity of the preform and inherently meet the first requirement of the invention—i.e., that preform-handle attachment be at a region outside of the main section of the blow mold and that the blown container shape and/or size be essentially unaffected by the inclusion of the handle.

A variety of embodiments are shown, for example, in FIGS. 1 through 4. All such embodiments share the common feature of preform-handle attachment being restricted to a region approximately corresponding with but a single plane which is normal to the major axis of the preform. In certain embodiments, handle attachment may be made to more than one point on the plane. One such, depicted in FIG. 3, serves as a carrying handle.

From a commercial standpoint, a significant area is considered and directed to blow molding of containers with handles, an extremity of which is on a second plane normal to the major axis of the container—a plane now corresponding with a blown region. For purposes of this description, this portion is referred to as the lower handle extremity. This preferred embodiment, generally serving as a pour handle, is accomplished by a variety of procedures.

A simple expedient description, represented, for example, by the structure of FIG. 4, contemplates simple forming or other distortion to produce a handle, perhaps an L-shaped configuration. The lower extremity, while on a plane corresponding with a blown region, is not attached to the blown wall. Integrity of such a structure is dependent upon the stiffness of the handle material, itself.

Another embodiment provides for mechanical attachment of the lower handle extremity. This may take the form of a band or even a label which may contain the printed matter identifying the contents of the container.

Embodiments represented, for example, by FIGS. 5, 6, 7, 8, and 9, involve a procedure in which only a minor modification is required in the blowing mold. Here an aperture in the mold is filled by the lower handle extremity so that the expanding preform conforms to such extremity in the same manner as it does to the mold. In general, temperatures attained during blowing, particularly during stretch blowing, are insufficient to result in adequate bond strength. The approach followed to overcome this problem in accordance with the invention may take the form of a complex shaped lower handle extremity to result in a mated pair with the corresponding wall region. Undercut configurations are considered particularly advantageous. For many purposes, undercutting takes the form of opposing surface regions including a mate portion having a thickness decrease in an outward direction of at least 10 percent within the region intruding into the mold. A corresponding configuration makes use of opposing inner wall regions defining at least a 10 percent increase in a void dimension over the length of handle extremity intruding into the mold. Such keyed configurations are considered to define a particularly valuable embodiment in accordance with the invention.

Keying intimacy may be assured by providing means for vibrating the handle extremity during the blowing operation. This is especially true in biorientation processes where temperatures are low and plastic stretching and moldability is more difficult to achieve. Such vibration promotes slippage of the side wall into the keyed configurations as well as generates localized heating in the sidewall to promote stretch and moldability.

Integrity of joinder, whether keyed or not, may be improved by a variety of bonding techniques. These include welding operations generally accomplished by frictional heating, as by spin welding or by other procedures in which contacting surfaces are placed in relative movement. Vibration may be at sufficiently high frequency and producing sufficient frictional heat to result in ultrasonic welding. A variety of alternative heating means may utilize external fields: magnetic, electric, or electromagnetic. As ordinarily practiced, electromagnetic welding, induction welding, as well as radiation welding may make use of intrinsic properties of the plastic material or may depend upon fillers which are designed to convert field energy to thermal energy. Such fillers may take the form of magnetically or electrically polar particles or may have larger absorption cross-section for radiation.

An expeditious form of bonding may involve chemical modification of the plastic, for example, by cross-linking. This cross-linking or curing which may be induced by radiation of suitable quantum energy may result from polymer cross-linking, for example, by inclusion of a difunctional curing medium—or for that matter, by any medium of greater polyfunctionality.

Local conductive heating is generally not preferred, particularly as practiced in stretch blow molding, since excessive heat conducted through the stretched sidewall results in degradation of those properties dependent upon biaxial orientation and release of orientation stress may result in collapse of the sidewall, possibly with its rupture. However, the handle extremity shown in FIGS. 13A through 13C represents a valuable embodiment in accordance with the invention which enables the use of local conductive heating. In this case, the handle extremity possesses a very thin section abutting the sidewall. This section may be heated sufficiently to fuse itself to the sidewall without generating sufficient heat content to substantially effect a deterioration of the thicker sidewall.

In some instances, bonding may result by use of a separate adhesive, for example, by use of a hot melt adhesive. This, too, while sometimes suitable, may be nonpreferred, since (a) effective adhesives for many suitable blow molding plastics are unavailable and (b) since use of an adhesive increases fabrication cost.

Bonding by whatever means may serve, itself, to result in joining of the lower handle extremity or may be used in conjunction with other embodiments, for example, with many of the undercut mating embodiments described above.

4. Definitions

Terms utilized in the description of this invention are used conventionally. For example, as described above, particularly useful embodiments depend upon injection molding to produce a preform and blow molding to produce the final container. These and other terms used in the description are briefly defined:

Plastic: a category of organic materials, generally thermoplastic, substituted or unsubstituted, hydrocarbons—examples are polyolefin, such as polypropylene, and polyesters, such as polyethylene terepthalate.

$T_c$: (glass transition) temperature at which the plastic changes from a glassy state to a rubbery state. Molding operations are invariably carried out substantially above $T_c$—generally at temperatures at least 100° F. in excess. Preferred embodiments herein which depend upon biaxial orientation are carried out with the plastic in the rubbery state but over a lower range, generally within 100° F. of $T_c$.

Molding: that category of procedures in which plastic material is caused to flow into the interstices of the mold to result in a formed object which becomes rigid upon cooling.

Preform: (occasionally referred to as parison) the molded form which, in the procedures of the invention, is formed preliminary to expansion to produce the final object and, therefore, a form somewhat smaller than that of the final object. As generally contemplated, the preform is produced with the plastic at an elevated temperature in excess of 100° F. above $T_c$.

Injection molding: that molding procedure generally utilized to produce the preform. In the usual commercial process, plastic materials introduced as particulate matter by a screw or ram with or without external heating is brought to elevated temperature so that it is introduced as a flowing plastic condition under pressure into a mold to produce the preform. Connecting passages known as runners are common.

Compression molding: One of the more common alternatives to injection molding to produce the handle in which a mass of plastic is heated and is introduced into a mold portion. Whereafter, an additional mold portion, such as a plunger, distorts the mass to cause it to conform, again, with the interstices of the now completed mold.

Blow molding: This term contemplates expansion of the preform to its final configuration by the use of gas under pressure. This requires use of a blow mold. As practiced in the past, no effort was made to change the temperature of the preformed plastic before or during the blowing operation. Some reduction in temperature naturally results from contact with the preform mold.

Injection blow molding: Procedure in which the preform is molded by injection.

Stretch blow molding: Blow molding in which the preform is stretched often by means of an inserted plunger prior to blowing. The procedure is recognized as advantageously practiced with the plastic material within a temperature range close to but above $T_c$ so as to result in extension of the polymer molecules from their natural twisted state to an extended state with the major molecular axis as resolved lying in the direction of stretch. Blowing is carried out within the same temperature range designed to result in retained orientation and produces orientation in the blow direction so that the resulting final configuration is "biaxially oriented".

Injection stretch blow molding: A procedure by which the preform is produced by injection molding with subsequent stretch blow molding to form the final configuration.

It has been stated that greatest commercial impact is believed to obtain in conjunction with biaxial orientation. While the process is well understood and while it has been procedurally defined in terms of temperature, it may be useful to define the term as applied to the finished product. The existence of biaxial orientation may be detected, destructively, by heating. Heating the blown section to temperatures well below that required for flow of unoriented material—temperatures as low as 50° F. above $T_c$ results in distortion of the plastic in a direction approaching that of the preform.

5. Material

Materials satisfactory for the practice of the invention are those satisfactory for blow molding—in a preferred embodiment those satisfactory for stretch blow molding. Both contemplate polymeric materials which at least during the blowing operation are thermoplastic. Compositionally, polymeric (or plastic) material satisfactory for use are hydrocarbons or substituted hydrocarbons. Materials include the simple unsubstituted homopolymers, polypropylene and polystyrene, substituted polymers, such as, acrylonitriles, and polyesters, such as polyethylene terephthalate. Biaxial orientation implies a suitable average polymer weight. Sufficient polymer weight (molecular size), generally, inherent in the specification of a normally solid room temperature polymer of satisfactory mechanical properties is likely to average at least 10,000 and is unlikely to exceed one or a few million molecular weight.

What is claimed is:

1. A plastic container formed from a preform having a neck portion and an expanded blown portion wherein the neck portion remains constant in size during blowing and wherein the expanded blown portion has a sidewall extending from the neck portion, comprising:
    attachment means integral with and on the sidewall,
    a handle including a ring intermediate the ends of the neck portion which is integral with and which extends substantially about the neck portion that remains substantially constant in size during expansion, and
    a projection positioned substantially within the breadth of the container which has a substantially horizontal portion integral with and extending from said ring, and a substantially vertical portion depending from said horizontal portion that has attachment means thereon which coact with said integral attachment means on said sidewall for affixing said depending portion thereto, to thereby provide a handle for gripping, lifting and pouring, wherein the stresses resulting therefrom are distributed about said ring.

2. The plastic container of claim 1, wherein the expanded portion thereof is biaxially oriented.

3. The container and handle of claim 1, wherein said attachment means on said substantially vertical portion of said handle and on said sidewall of the container are interlocking means.

4. The container and handle of claim 1, wherein said attachment means on said container sidewall is a projection adapted to be in engagement with said substantially vertical portion of said handle to affix said handle thereto.

5. The container and handle of claim 1, wherein said attachment means on said container sidewall is a lug, and wherein said substantially vertical portion of said handle has projections which engage sides of said lug to lock said handle thereto.

6. The container and handle of claim 1, wherein said substantially vertical portion of said handle includes a wafer thin member extending therefrom adapted to be bonded to said attachment means on said sidewall of the container to affix said handle thereto.

7. The container and handle of claim 1, wherein said attachment means on said substantially vertical portion of said handle and on said sidewall of the container are snap fitting means.

8. The container and handle of claim 1, wherein said attachment means on said substantially vertical portion of said handle and on said sidewall of the container are bonding means.

9. The container and handle of claim 1, wherein said attachment means on said substantially vertical portion of said handle and on said sidewall of the container are welding means.

10. The container and handle of claim 1, wherein said attachment means on said substantially vertical portion of said handle and on said sidewall of the container are adhesive means.

* * * * *